US008023412B2

(12) United States Patent
Maxemchuk et al.

(10) Patent No.: US 8,023,412 B2
(45) Date of Patent: Sep. 20, 2011

(54) SYSTEMS AND METHODS FOR MODELING A MOBILE AD HOC WIRELESS NETWORK

(75) Inventors: Nicholas F. Maxemchuk, Mountainside, NJ (US); Congzhou Zhou, New York, NY (US)

(73) Assignee: The Trustees of Columbia University in the city of New York, New York, NY (US)

( * ) Notice: Subject to any disclaimer, the term of this patent is extended or adjusted under 35 U.S.C. 154(b) by 155 days.

(21) Appl. No.: 12/496,863

(22) Filed: Jul. 2, 2009

(65) Prior Publication Data

US 2010/0002583 A1 Jan. 7, 2010

Related U.S. Application Data

(63) Continuation of application No. PCT/US2008/058474, filed on Mar. 27, 2008.

(60) Provisional application No. 60/908,288, filed on Mar. 27, 2007, provisional application No. 60/938,812, filed on May 18, 2007.

(51) Int. Cl.
*G01R 31/08* (2006.01)
(52) U.S. Cl. .................................. 370/235; 370/229
(58) Field of Classification Search .................. 370/235, 370/252, 338; 455/450
See application file for complete search history.

(56) References Cited

U.S. PATENT DOCUMENTS

| 7,782,774 | B2 * | 8/2010 | Cheriton | 370/232 |
| 2004/0166864 | A1 * | 8/2004 | Hill et al. | 455/450 |
| 2005/0083850 | A1 | 4/2005 | Sin et al. | |
| 2006/0146704 | A1 | 7/2006 | Ozer et al. | |
| 2007/0280174 | A1 * | 12/2007 | Pun | 370/338 |

* cited by examiner

*Primary Examiner* — Ricky Ngo
*Assistant Examiner* — David Oveissi
(74) *Attorney, Agent, or Firm* — Baker Botts L.L.P.

(57) ABSTRACT

Systems and methods for modeling a mobile ad hoc wireless network are disclosed herein. In some embodiments of the disclosed subject matter, methods for modeling a mobile ad hoc wireless network for a predetermined geographical area. An exemplary method includes dividing the geographic area into a network grid including a plurality of network grid elements, locating obstacles, if any, to communication between transmission nodes located in at least two different grid elements from the plurality of network grid elements, locating bottlenecks within the plurality of network grid elements, locating network grid elements from the plurality of network grid elements where wireless transmission is unconstricted, determining a transmission flow rate across the bottlenecks, and comparing the transmission flow rate across the bottlenecks to determine if any of the bottlenecks are not real bottlenecks.

21 Claims, 10 Drawing Sheets

INTERMEDIATE ANCHOR POINT

FIG.7(b)

FIG.8

SYSTEMS AND METHODS FOR MODELING A MOBILE AD HOC WIRELESS NETWORK

CROSS REFERENCE TO RELATED APPLICATIONS

This application is a continuation of International Application PCT/US08/058,474, filed Mar. 27, 2008, which claims priority to U.S. Provisional Application Ser. No. 60/908,288, filed Mar. 27, 2007, and U.S. Provisional Application Ser. No. 60/938,812, filed May 18, 2007, the contents of which are incorporated by reference in their entireties herein.

STATEMENT REGARDING FEDERALLY-SPONSORED RESEARCH

This invention was made with government support under CNS-05-19663 awarded by the National Science Foundation. The government has certain rights in the invention.

BACKGROUND

1. Field

The present application relates to systems and methods for modeling a mobile ad hoc wireless network.

2. Background Art

A mobile ad hoc network (MANET) includes a collection of mobile nodes that construct a communication network by forwarding data between currently reachable nodes rather than using a fixed infrastructure. In commercial applications, MANETs provide a mechanism to try new services with a smaller investment in infrastructure than wired networks. Providing Quality of Service (QoS) guarantees in MANETs extends the range of possible new services, such as Voice over IP, that can use these networks.

Much research has been conducted and many solutions have been proposed to provide QoS guarantees in wired networks. However, because of the differences between wired and wireless communication and the frequently changing network topology in a mobile environment, current research on flow and access control has focused on finding new solutions for MANETs, rather than directly applying insights from previous work on wired networks. For example, K. Chen, K. Nahrstedt, and N. Vaidya, "The utility of explicit rate-based flow control in mobile ad hoc networks," *Proc. 2004 IEEE Wireless Communications and Networking Conference*, Atlanta, Ga., March 2004 provides an alternative protocol design for MANETs. Thus, there is a need for a technique that addresses the problems associated with MANETs using the insights gained from the more stable wired network.

SUMMARY

Systems and methods for modeling a mobile ad hoc wireless network are disclosed herein.

In some embodiments of the disclosed subject matter, methods for modeling a mobile ad hoc wireless network for a predetermined geographical area. An exemplary method includes dividing the geographic area into a network grid including a plurality of network grid elements, locating obstacles, if any, to communication between transmission nodes located in at least two different grid elements from the plurality of network grid elements, locating bottlenecks within the plurality of network grid elements, locating network grid elements from the plurality of network grid elements where wireless transmission is unconstricted, determining a transmission flow rate across the bottlenecks, and comparing the transmission flow rate across the bottlenecks to determine if any of the bottlenecks are not real bottlenecks.

In some embodiments, locating bottlenecks includes determining the minimum distances between two obstacles having a line of sight between them, storing the minimum distances in numerical order, and designating, in numerical order, the minimum distances as bottlenecks, wherein each subsequent minimum distance does not intersect any bottleneck already designated.

In some embodiments, locating bottlenecks further includes removing any bottlenecks that create areas only surrounded by bottlenecks, removing duplicate bottlenecks between the same two obstacles, and removing bottlenecks that create small areas with respect to the size of the bottlenecks. In some embodiments, a method for modeling further includes removing the bottlenecks that are not real bottlenecks from the model.

In some embodiments, determining the transmission flow rate across the bottlenecks is performed by a transmission flow control algorithm. In some embodiments, the transmission flow control algorithm is a max-min fair bottleneck flow control algorithm. In some embodiments, comparing the transmission flow rate across the bottlenecks to determine if any of the bottlenecks are not real bottlenecks includes ordering the transmission flow rate information for the bottlenecks based predetermined criteria, and determining which bottlenecks have corresponding transmission flow rates that fall below a predetermined threshold. In some embodiments, comparing the transmission flow rate across the bottlenecks to determine if any of the bottlenecks are not real bottlenecks further includes determining whether the removal of any bottlenecks would result in network grid elements where wireless transmission is unconstricted to enclose network grid elements where wireless transmission is constricted.

In some embodiments, locating network grid elements from the plurality of network grid elements where wireless transmission is unconstricted includes locating network grid elements surrounded by at least one obstacles and at least one bottlenecks. In some embodiments, transmission nodes located within the transmission areas are modeled as super-nodes. In some embodiments, the bottlenecks are modeled as links between the transmission areas. In some embodiments, control of admission to the network is controlled locally at each of the super-nodes by nodes designated as group leaders. In some embodiments, the group leaders are selected based on their proximity to a predetermined location in the super-node. In some embodiments, the group leaders are unselected when their distance from a predetermined location in the super-node exceeds a predetermined distance.

In some embodiments of the disclosed subject matter, systems for modeling a mobile ad hoc wireless network for a predetermined geographical area. An exemplary system includes a processor, a wireless connection device operatively coupled to the processor, and a memory operatively coupled to the processor, the memory storing program instructions that when executed by the processor, cause the processor to utilize the wireless connection device to divide the geographic area into a network grid including a plurality of network grid elements, locate obstacles, if any, to communication between transmission nodes located in at least two different grid elements from the plurality of network grid elements, locate bottlenecks, within the plurality of network grid elements, locate network grid elements from the plurality of network grid elements where wireless transmission is unconstricted, determine a transmission flow rate across the bottlenecks, and compare the transmission flow rate across the bottlenecks to determine if any of the bottlenecks are not real bottlenecks.

In some embodiments of the disclosed subject matter, methods for determining the a route for information packets to travel across a mobile ad hoc wireless network to avoid congestion in bottleneck areas, for a predetermined geographical area. An exemplary method includes dividing the geographic area into a network grid including a plurality of network grid elements, locating obstacles, if any, to communication between transmission nodes located in at least two different grid elements from the plurality of network grid elements, locating bottlenecks, within the plurality of network grid elements, locating network grid elements from the plurality of network grid elements where wireless transmission is unconstrained, and applying a probabilistic geographic routing algorithm to find a grid-by-grid path for the information packets to travel across.

In some embodiments, the probabilistic geographic routing algorithm operates in a geographic routing phase where packets of information are routed through anchor points, where the anchor points are located at the bottlenecks. In some embodiments, the probabilistic geographic routing algorithm operates in a probabilistic routing phase where packets of information are routed between anchor points, where the anchor points may be any network grid element located along a bottleneck. In some embodiments, the probabilistic geographic routing algorithm operates in a probabilistic routing phase where packets of information are routed through anchor points, where the anchor points may be any network grid element located between bottlenecks. In some embodiments, the probabilistic geographic routing algorithm operates to allow for four directional forwarding of packets of information. In some embodiments, the probabilistic geographic routing algorithm operates to allow for eight directional forwarding of packets of information.

BRIEF DESCRIPTION OF THE DRAWINGS

The accompanying drawings, which are incorporated and constitute part of this disclosure, illustrate some embodiments of the disclosed subject matter.

DETAILED DESCRIPTION

The Macro Model

The disclosed subject matter provides techniques for creating a macro model of mobile ad hoc networks that combines individual nodes into super-nodes, and performs flow control on the super-nodes. The model partitions the area of the network into transmission areas, where nodes can be located and can communicate, and obstacles, that inhibit communications or are areas where there are no nodes. The spaces between nearby obstacles are bottlenecks that inhibit the flow of data in the network. By controlling the flow of data across the bottlenecks, the model can control congestion and hence provide Quality of Service (QoS) guarantees.

Figure 1:
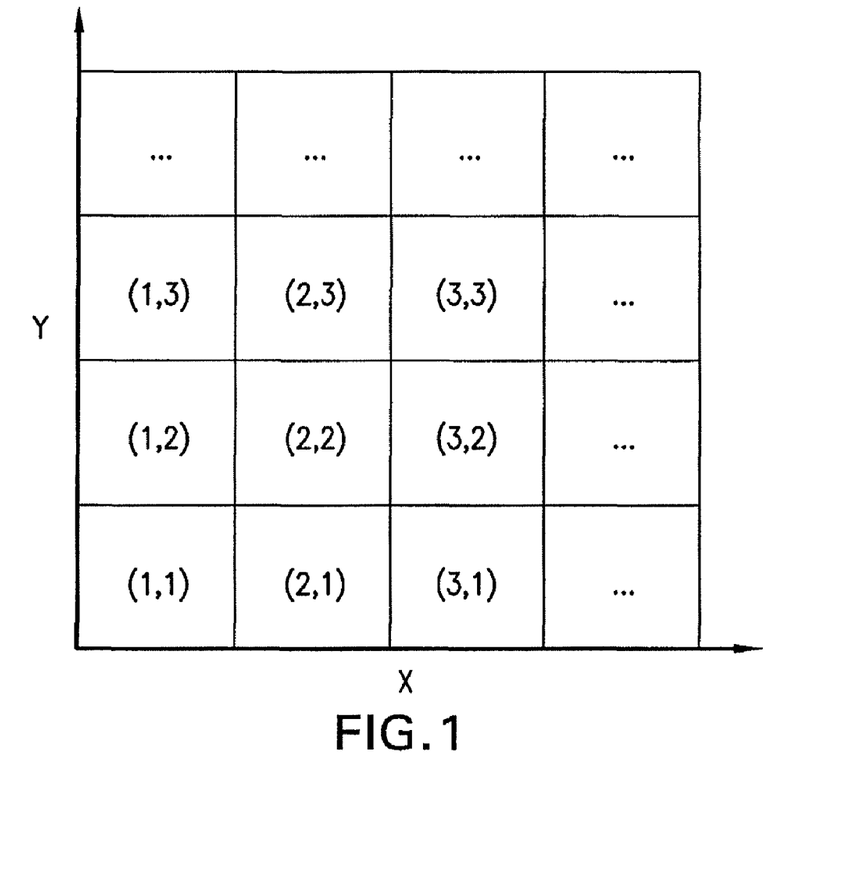
FIG. 1 illustrates a grid numbering scheme in accordance with an embodiment of the disclosed subject matter.

FIG. 1 shows the geographic area of an exemplary network is partitioned into virtual grids of the same size, identified by their unique (x,y) coordinates. The model assumes that every mobile node in the network knows its geographic location through GPS devices or other techniques, for example, an iterative triangulation technique using information from neighboring nodes. However, it is understood that not every mobile node is required to know its geographic location for the model to function properly. Based on the location information, each node can calculate which grid element it currently belongs to. The grid structure does not require a highly accurate positioning system because even when nodes near the edge of a grid element make a mistake about which grid elements they are in, the model still works.

An obstacle exists at the boundary of a grid element when nodes in the grid element cannot directly communicate with nodes in an adjacent grid element. The obstacles can be permanent, such as buildings or lakes, or temporary, as when no wireless nodes can forward traffic at the present time. The model approximates obstacles on a grid structure by composing obstacles from the edges of grid elements that cannot communicate with nodes in an adjacent grid element. For example, if grid element (1,1) cannot communicate with grid element (1,2), then the model considers there to be an obstacle along the line separating grid elements (1,1) and (1,2). This approximation is easier to store and process than the actual obstacle structure, and is more stable as nodes at the edge of an obstacle may move.

The situation may occur were an obstacle is only partially located in grid element. The model can use the simple rule, stated above, that if a node in an adjacent grid element cannot communicate with a node in partially occupied grid element, then the obstacle is presumed to exist along the line separating the grid elements. However, an alternative rule where if more than a certain percentage of a grid, say for example 50%, is occupied by an obstacle then it can be considered wholly occupied. Alternatively, the partially occupied grid element can be broken down into smaller grid elements, for a more exact mapping of the obstacles. Yet another solution would be to change the shape of the adjacent grid element to be rectangular, i.e., extending the grid element to more closely trace the actual outline of the obstacle. However, due to the versatility of the model, highly accurate mapping of the obstacle is not needed and, therefore, the more basic rule stated above can suffice.

Figure 2A:
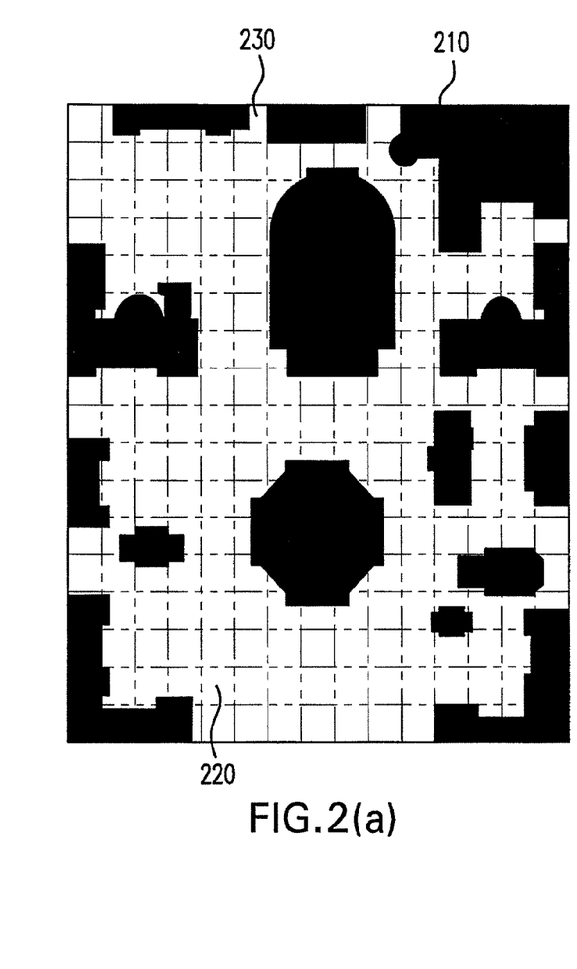
FIG. 2(a) is a schematic of a geographical area including building and open area and overlayed with a grid in accordance with an embodiment of the disclosed subject matter.
Figure 2B:
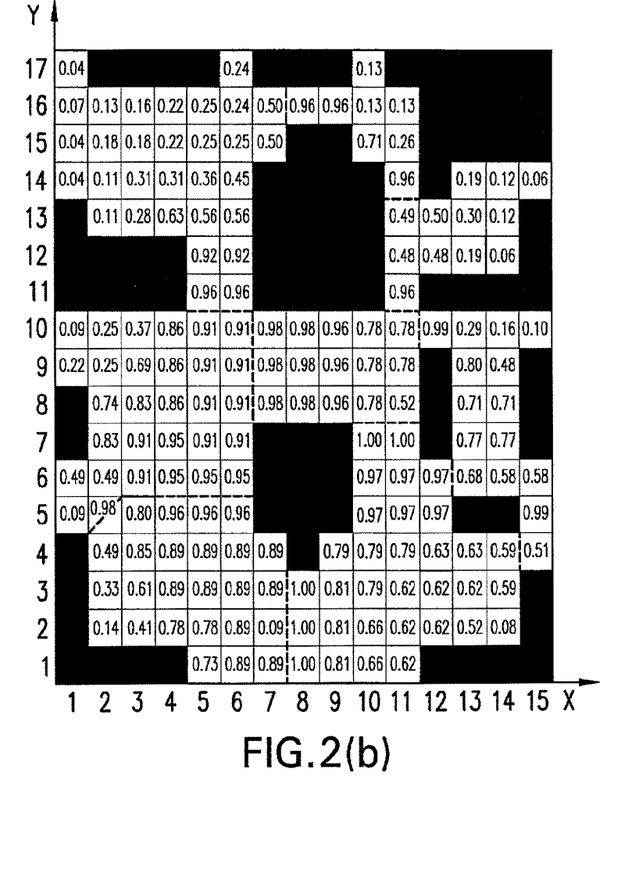
FIG. 2(b) is a schematic of a geographical area including building and open area and overlayed with a grid after application of an obstacle approximation in accordance with an embodiment of the disclosed subject matter.
Figure 3:
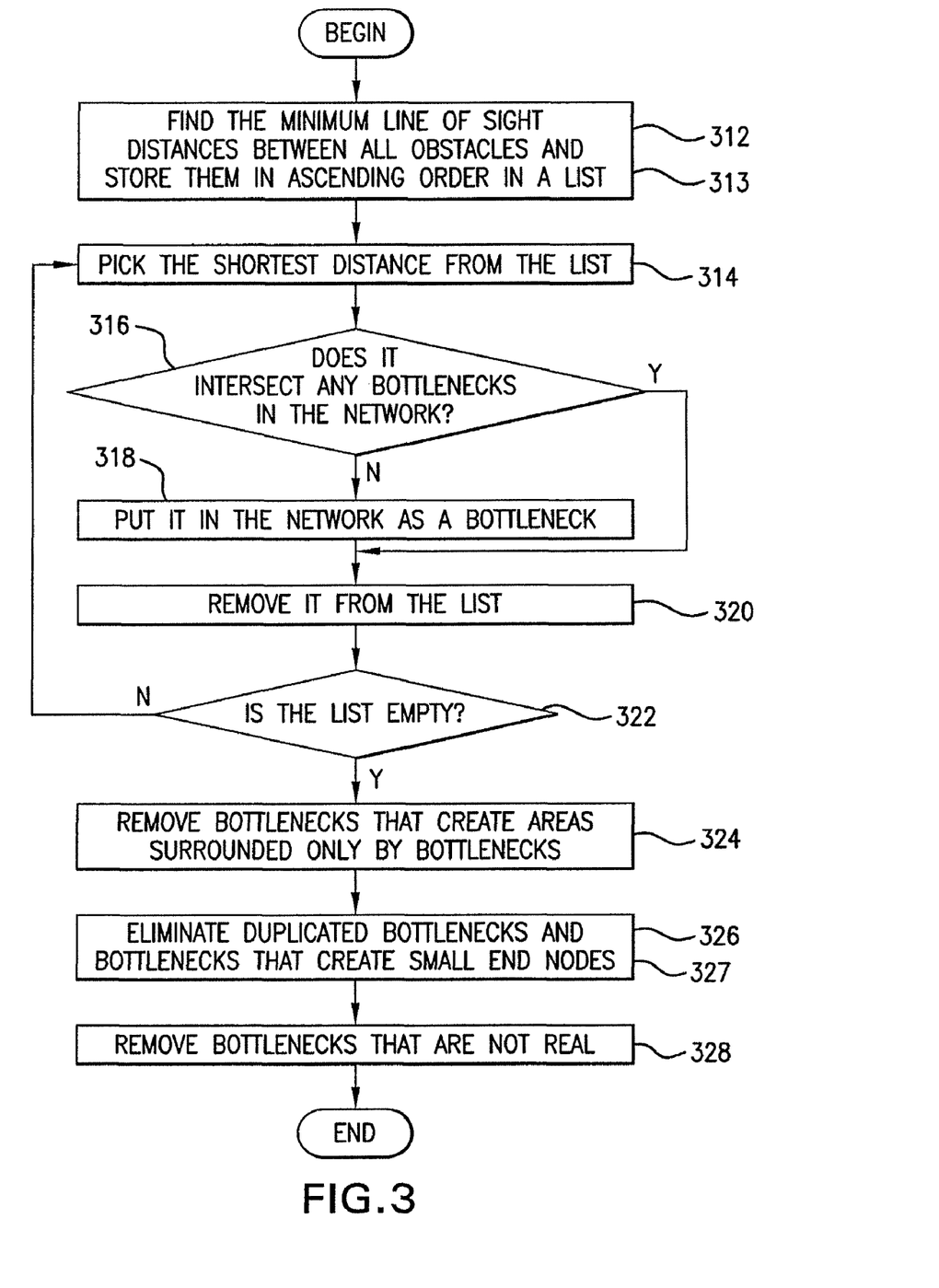
FIG. 3 illustrates a chart of a method in accordance with an embodiment of the disclosed subject matter.

FIG. 2(a) shows the application of the virtual grid onto the main portion of the Columbia University Morningside campus, between Amsterdam Avenue and Broadway. In FIG. 2(a), the solid black objects, such as 210, are the buildings and are permanent obstacles. The large open areas in FIG. 2(a), such as 220, represent the transmission areas, where communication between adjacent nodes will be unconstrained by permanent obstacles, such as 210. However, temporary obstacles, as when no wireless nodes can forward traffic at the present time in an adjacent grid, may appear in the transmission areas.

FIG. 2(a) also shows areas where bottlenecks are likely to appear, such as 230. When two obstacles are near one another, the gap between the obstacles determines the maximum flow between regions on each side of the gap. The gaps are identified as bottlenecks that constrain the flows in the network. The capacity of the bottlenecks depends on the number of simultaneous transmissions that can occur in the gap. In the model, it is assumed the flow capacity is proportional to the physical length of the gap.

FIG. 2(a) shows the application of the obstacle approximation rule outlined above onto the main portion of the Columbia University Morningside campus.

The network can be partitioned into transmission areas surrounded by obstacles and the most constraining bottlenecks utilizing a partition rule, discussed in detail below. All nodes in each transmission area can be modeled as a single super-node and the bottlenecks connecting the transmission areas can be modeled as links connecting the super-nodes. In other words, areas that share a bottleneck have an undirected link joining the super-nodes. The link is undirected because it is the total flow across the bottleneck, rather than the flows in each direction, that is constrained. The capacity of the link is the capacity of the bottleneck. Thus, the method produces a macro model of a wireless network as a collection of super-nodes and links that resembles a wired network. Conventional flow control algorithms that are designed for wired networks can thus be applied directly to the macro model of the wireless networks.

Partition Rules

The rules for partitioning the network will be described in further detail now, with reference to FIGS. 3 and 4(a)-(c). First, the minimum distances between any obstacles $O_i$ and $O_j$, as seen on FIGS. 4(a)-(c), that have a line of sight between them are determined 312 and stored 313 in ascending order. There can be multiple minimum distances between a pair of obstacles with the same value; all of them are stored 313 and duplicates can be removed later, as detailed below. The shortest distance on the list of minimum distances between obstacles is entered 314 into the model as a bottleneck. The next shortest minimum distance between obstacles is queried 316 to determine if it intersects any bottlenecks already in the model. If the answer to the query 316 is no, then that next shortest minimum distance is entered 318 into the model as a bottleneck. Once a bottleneck is entered into the model, it is removed 320 from the list. If the answer to the query 316 is yes, then 318 is skipped and that minimum distance is removed 320 from the list. The list is queried 322 to determine if any minimum distances remain on it the list. If the answer to the query 322 is yes, then the process begins again at 314 until all minimum distances between obstacles have been either entered 318 into the model and/or removed 320 from the list.

Figure 4A:
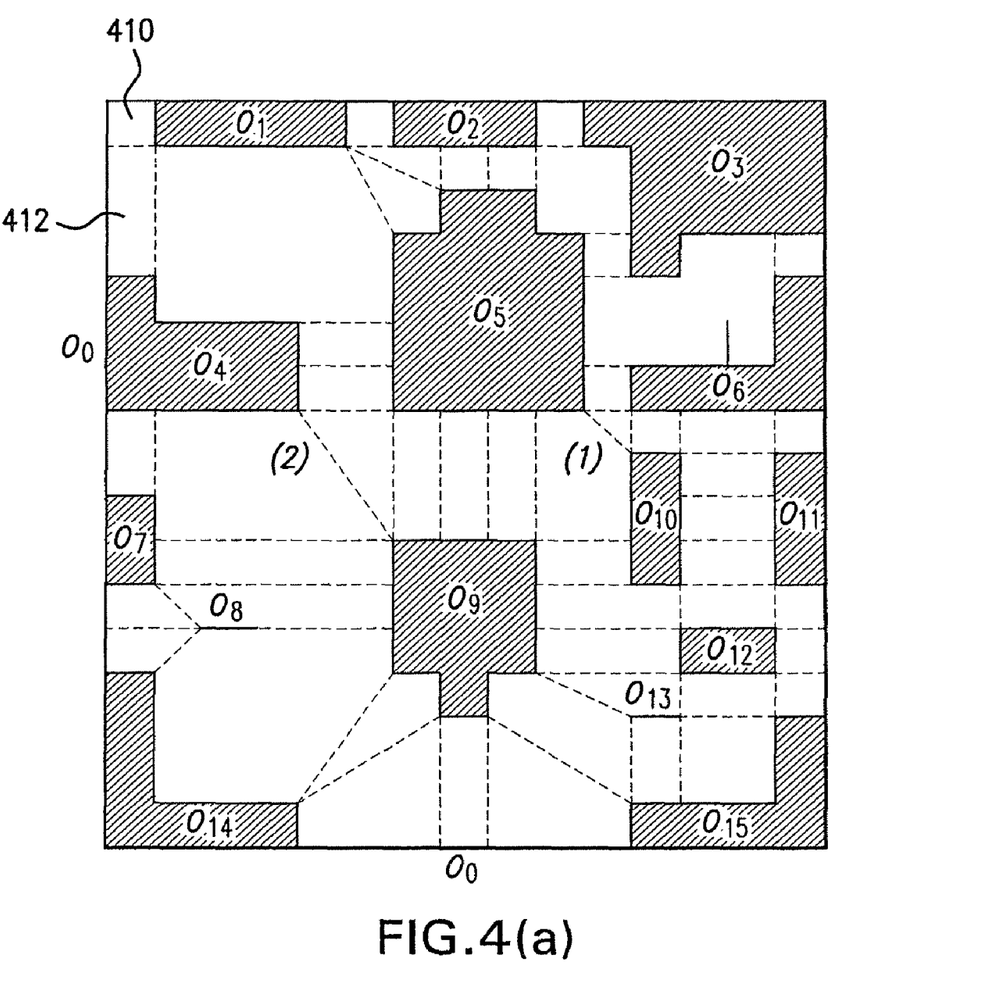
FIGS. 4(a)-(c) are a schematic of a network after application of a partition rule in accordance with an embodiment of the disclosed subject matter.

FIG. 4(a) shows the network partition after applying the above partition rules to the Columbia University campus. The dashed lines are the bottlenecks identified by utilizing the above partition rules. The objects $O_i$ through $O_j$ are obstacles, identified by a approximation rule, as discussed above. Note that $O_0$, the perimeter of this section of the campus is considered to be a single obstacle.

The set of bottlenecks produced utilizing the above rule can be reduced using a variety of geometric rules. Since transmission areas can be defined as areas surrounded by obstacles and bottlenecks, bottlenecks that create areas only surrounded by other bottlenecks, such as dashed lines (1) and (2) in FIG. 4(a), can be removed 324. In such a case, the longest of the bottlenecks forming an area only surrounded by other bottlenecks can be removed 324. Next, duplicate bottlenecks between the same obstacle pair can be removed 326. A rule applied for selecting among the duplicate is to attempt to equalize the size of the transmission areas because the network is most stable when the smallest areas are as large as possible. However, creating transmission areas with internal bottlenecks, e.g., dumbbell-shaped areas, should be avoided, as this can reduce the efficiency of network communication. Bottlenecks that create small transmission areas with respect to the size of the bottleneck can be removed 327. For example, the bottlenecks forming transmission areas 410 and 412 on FIG. 4(a), would be appropriately removed on the basis of this rule.

Figure 4B:
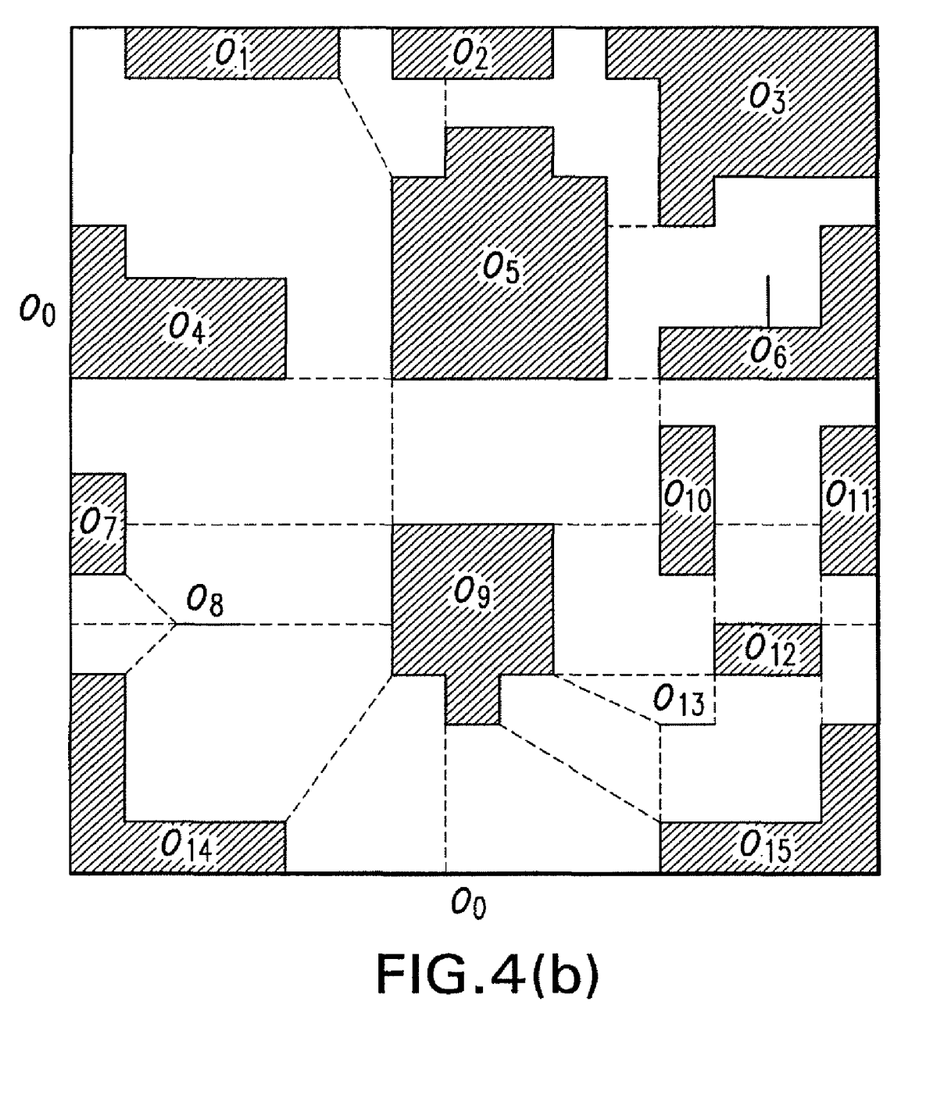

FIG. 4(b) shows the network partition after application of the above portion of the partition rule.

The geometric rules stated above can eliminate the duplicate bottlenecks and the bottlenecks that create small transmission areas, but to get better stability, flow control information can be used to further refine the model, by identifying and removing 328 bottlenecks that are not real bottlenecks, i.e., "false" bottlenecks. These bottlenecks are less congested according to the transmission flow rates measured over all the bottlenecks as determined by a flow control algorithm. The goal is to obtain the largest transmission areas surrounded by the most constrained bottlenecks. However, the geometry of the distribution of transmission areas and bottlenecks remains important due to the inefficiency of dumbbell-shaped transmission areas.

The false bottlenecks are located by applying a flow control algorithm to the network, and measuring the transmission flow rate across the existing bottlenecks. An exemplary algorithm can be a minimum distance routing and max-min fair bottleneck flow control. All of the nodes in a transmission region can be modeled as a single super node located at the center of the transmission area, and the bottlenecks can be modeled as links between the super nodes. Thus, the model can resemble a wired network and we can apply wired techniques can be applied to this model. The location information, e.g., the center of each transmission area and the center of each bottleneck, can be used to find the minimum distance between each pair of super-nodes and can be further used as the routing path.

The max-min fair control policy can be implemented taking all flows that have the same network allocation and increasing all flows until the first bottleneck becomes saturated. When the flows over the first bottleneck are saturated their network allocations can be fixed. The flows that are not fixed can be increased until a second bottleneck becomes saturated. The flows over that bottleneck can then be fix. This procedure can be continued until all bottlenecks are saturated. The utilization, ρ, for a bottleneck can be defined as $$\rho_i = \frac{f_i}{C_i}, \tag{1}$$

where $f_i$ is the flow rate passing bottleneck i, and $C_i$ is the capacity of bottleneck i (it can be assumed the bottleneck capacity is proportional to the physical length of the bottleneck).

That data is then logged in numerical order, and all bottlenecks whose utilization, ρ, falls below a certain predetermined cut-off can be removed 328 from the model as false bottlenecks. However, exceptions may be present where geometric considerations would create dumbbell-shaped transmission areas. A mobile network will be more stable with larger transmission areas separated by the most congested bottlenecks, thus false bottlenecks can be removed to obtain a higher level of stability necessary for QoS guarantees.

The model can measure the transmission flow rate across the existing bottlenecks using a shortest path flow control algorithm, e.g., a max-min fair bottleneck flow control algorithm. However, it is envisioned that another flow control algorithm can be used, such as an optimum routing and flow control algorithm or any other appropriate alternative. The choice of flow control algorithm can be made on a case-by-case basis with reference to the kind of application, e.g., Voice over IP, that is going to be used across the network. Additionally, the flow control algorithms used in wired networks do not require that all of the links are bottleneck links. However, the flow control algorithm used to measure the transmission flow rate across the existing bottlenecks for the purpose of identifying and removing false bottlenecks should be consistant with the flow control algorithm used for the global routing of transmissions over the network, described in detail below. The local routing of transmissions over the network, on the other hand, can operate on using a different flow control algorithm.

Figure 4C:
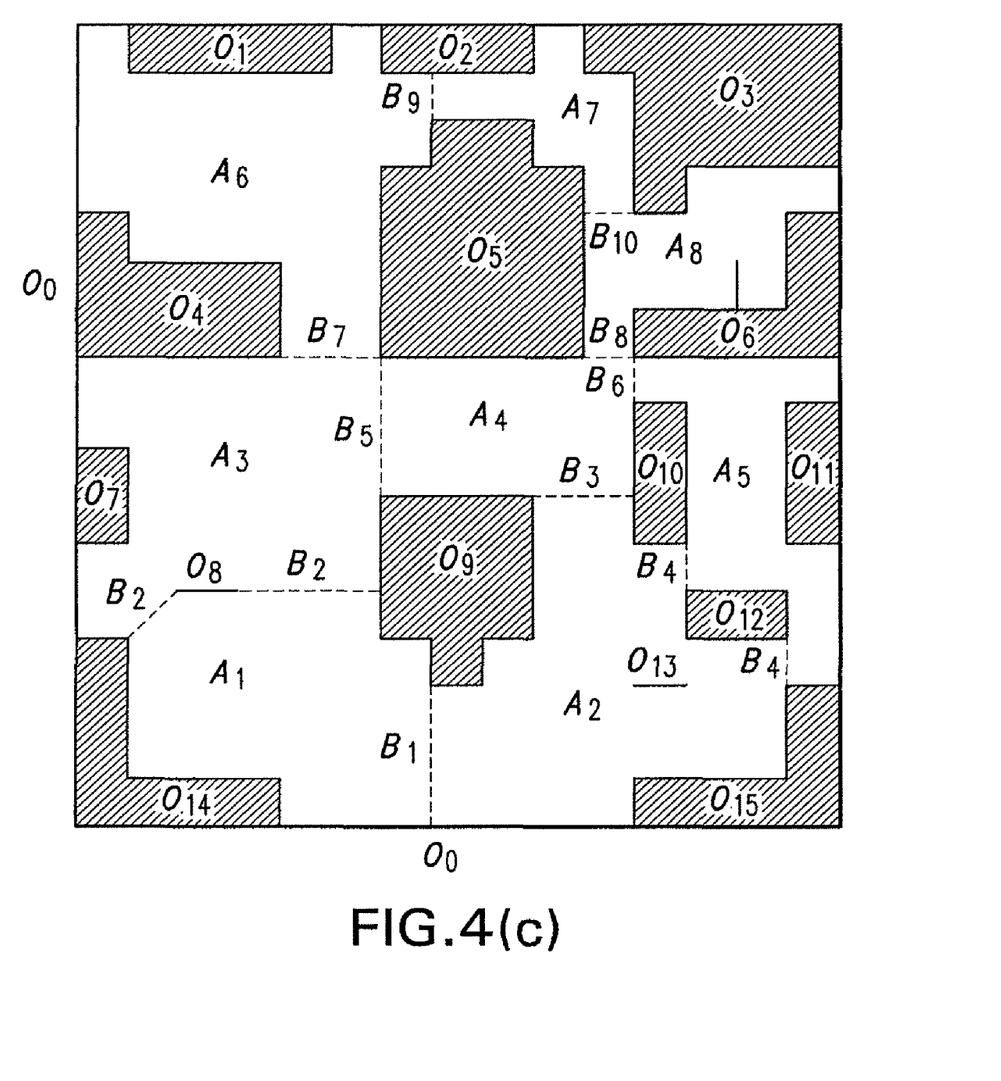

FIG. 4(c) shows the network partition after application of the above portion of the partition rule.

Figure 5:
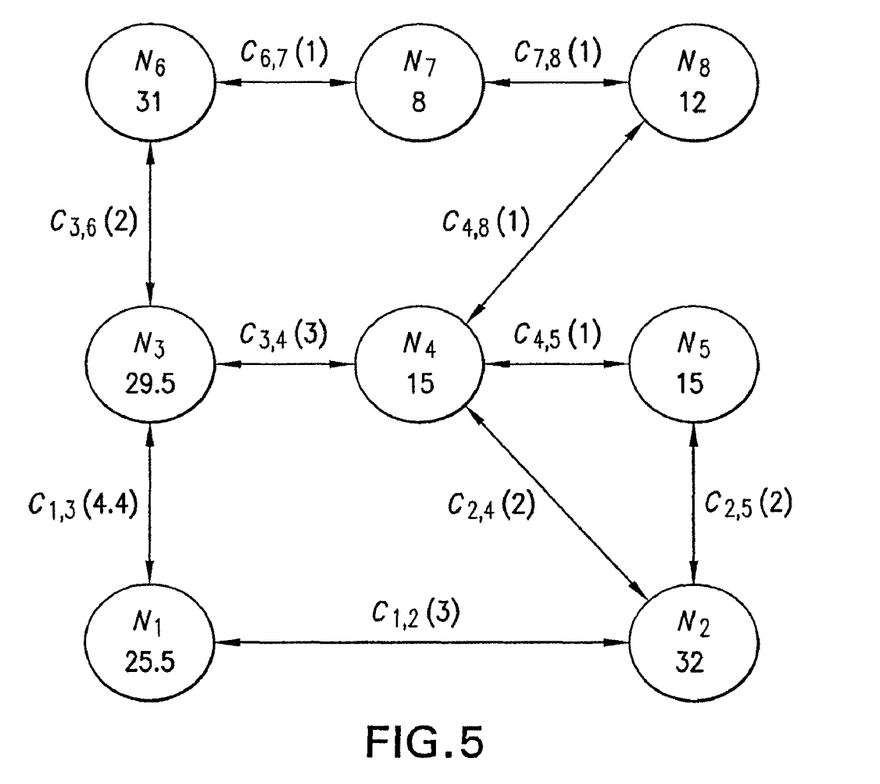
FIG. 5 is a schematic of a network after application of a partition rule in accordance with an embodiment of the disclosed subject matter.

FIG. 5 shows the model of the network that resembles a wired network. The numbers in the circle indicate the size of the super-nodes, in terms of number of grid elements. $N_i$ represents the super-node corresponding to the transmission area $A_i$ on FIGS. 4(a)-(c). $C_{i,j}(x)$ represents the bottleneck link between super-node i and j, with a capacity of x measured as a function of the number of grid elements, corresponding to the bottlenecks $B_i$ on FIGS. 4(a)-(c).

Flow Control Procedure

The macro model can be implemented to control the mobile wireless network by using global and local flow control procedures. On the global level, a central node is utilized to gather information on the transmission flow rates, then assign to each super-node a transmission flow capacity with reference to each other super-node. For example, super-node $N_i$ will be assigned a transmission flow capacity for any source node contained therein to utilize in reaching any destination node contained in super-node $N_j$. This capacity can be determined by the number of bottleneck links that a transmission flow must cross to reach its destination.

A transmission flow's admission to the network is control locally at each super-node. A group leader in the super-node assigns flows allocated by the global flow control algorithm to specific source-destination pairs. The group leaders control the probability of dropped connections when nodes move between areas by assigning only a fraction of the allocated transmission flow capacity. When there are a large number of nodes in a super-node, this procedure is simple to implement and is less affected by mobility.

The group leader can be selected based on its proximity to the center of the super-node and replaced when it leaves a radius that is well within the area. Utilizing such a rule makes it is less likely that the group leader will leave the super-node. However, it is envisioned that proximity to any location inside the super-node could be used as criteria for selecting a group leader for that super-node.

Routing Algorithms

The global flow control procedure in the macro model only determines the super-nodes and the bottlenecks that a transmission flow must cross; it does not specify the complete path a packet traverses. The model can use a probabilistic geographic routing algorithm to select the complete grid-by-grid route between a source-destination pair of nodes. A probabilistic routing algorithm can be used to eliminate hot spots that occur either in a grid element within a super-node or in a grid element that is part of a bottleneck. The probabilistic geographic routing algorithm operates on two levels: a global level and a local level.

Figure 6:
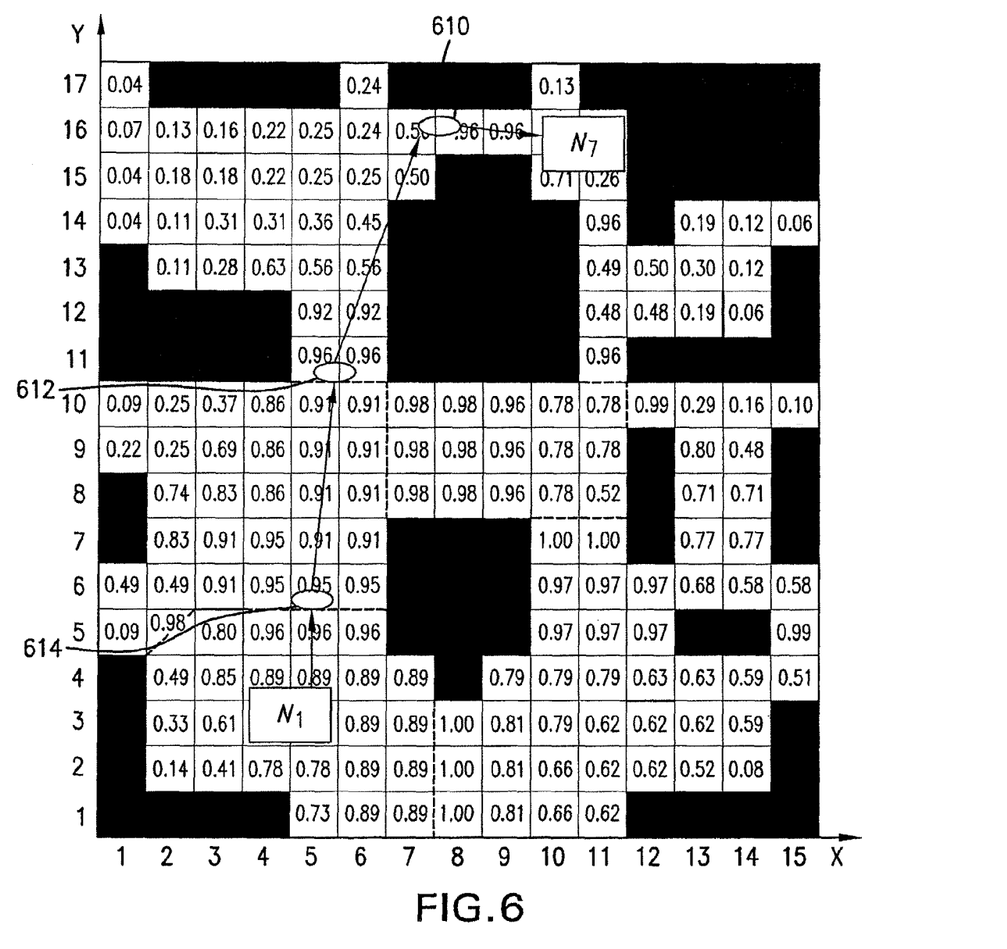
FIG. 6 is a schematic of a network showing a path transmissions could follow in accordance with an embodiment of the disclosed subject matter.

On the global level the algorithm operates in the geographic routing phase, and can use the bottlenecks specified by the macro model as anchor points to calculate the route between nodes located in different super-nodes. On a global level hot spots can occur on a grid elements that are part of a bottleneck. The reason for this is the intersection of transmission flows on that grid element, such as when a shortest path flow control algorithm is utilized. Anchor points used by the geographic routing algorithm can be the bottlenecks themselves. When, for example, the geographic routing algorithm is of the shortest path variety the bottlenecks used as anchor points will be those bottlenecks that fall on the shortest path between the super-nodes containing the source and destination nodes of the transmission. FIG. 6 shows such an example, where anchor points 610, 612 and 614 can be used by a geographic routing algorithm to route a transmission from super-node $N_1$ to $N_7$.

On the local level the algorithm operates in the probabilistic routing phase and can distribute the transmission flows within the super-nodes between the bottlenecks. On a local level hot spots occur within super-nodes and are caused by transmission flows between different bottlenecks intersecting at a common grid element. On a local level, the anchor points can be specified as particular grid elements that are located at the bottlenecks. The packet is not required to reach a specified node in the grid element. This makes the grid routing mechanism more resilient to the movement of individual nodes. Between bottlenecks, the packet can select the shortest grid path to travel. Since in the wireless network, nodes share a common transmission medium, routing within the super-node should minimize the number of transmissions inside a super-node by choosing the shortest grid path.

Figures 7A, 7B:
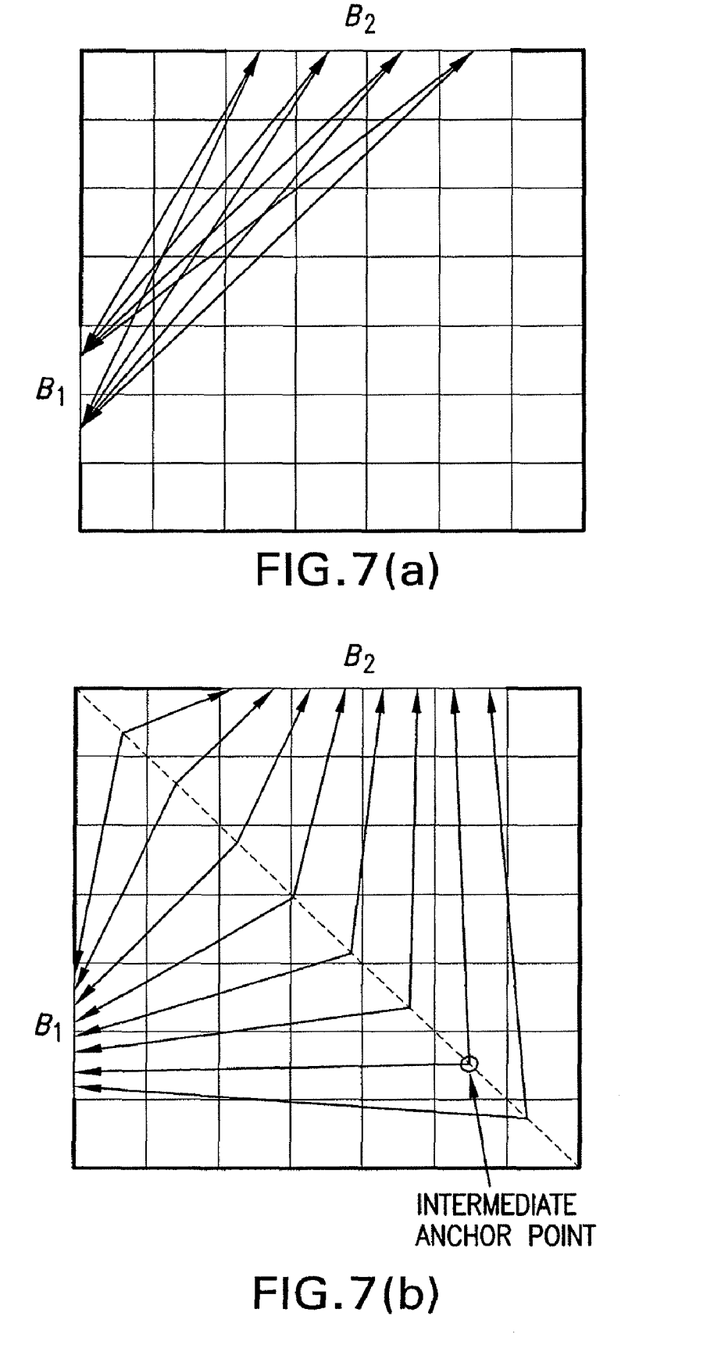
FIGS. 7(a)-(b) illustrate paths transmissions could follow in accordance with an embodiment of the disclosed subject matter.

To fully utilize the capacity of the bottlenecks, packets should be uniformly distributed among all the bottleneck grid elements. Thus the probabilistic routing algorithm, when a packet must be forwarded to bottleneck $B_{i,j}$, selects each of the grid elements $G_k(x,y) \in B_{i,j}$ with probability $p_k$ as shown in FIG. 7(a). When $$p_k = \frac{1}{O(B_{i,j})}, \quad (2)$$

where $O(B_{i,j})$ is the number of grid elements in bottleneck $B_{i,j}$, for each flow crossing bottleneck $B_{i,j}$, the traffic across the bottleneck is uniform, and a greater throughput is obtained.

Traffic from several bottlenecks may cross inside a super-node and also interfere with the local traffic within the super-node, creating a hot spot. To reduce the likelihood of hot spots, it can be advantageous to spread the traffic out within the super-node. This can be accomplished by selecting additional intermediate anchor points within the super-node as shown in FIG. 7(b). Thus, probabilistic geographic routing reduces probability of a hot spot by spreading the traffic over a wide area.

System

Figure 8:
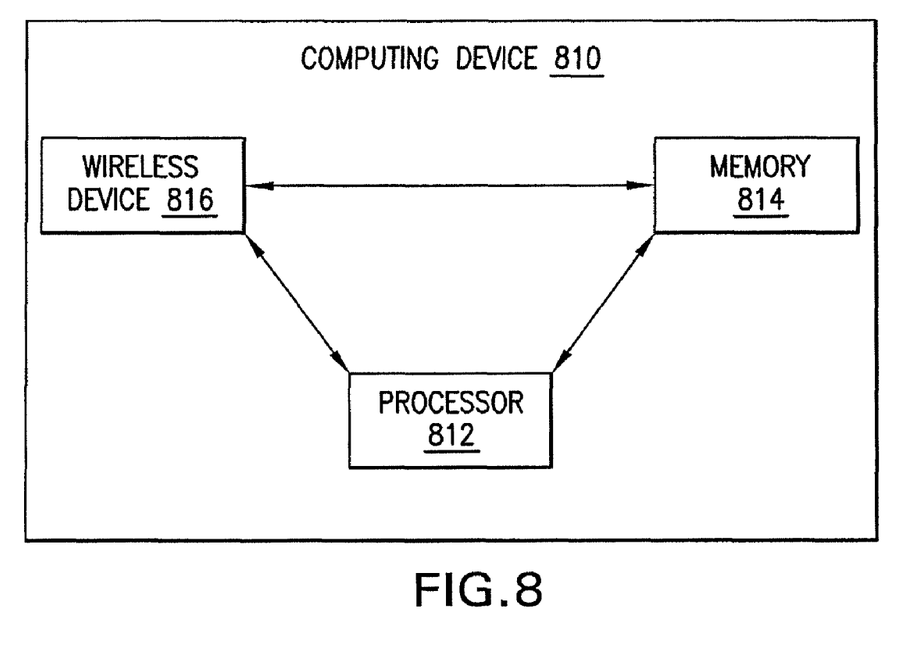
FIG. 8 is a schematic of a system in accordance with an embodiment of the disclosed subject matter.

FIG. 8 is an exemplary embodiment of a system 800, with a computing device 810 including at least a processor 812 operatively connected to a memory 814, and operatively connected to a wireless connection device 816, that can be running a wireless standard, e.g., the 802.11 standard. The computing device 810, may be a standard personal computer or a laptop, running suitable software to implement the techniques described herein.

It will be understood that the foregoing is only illustrative of the principles of the disclosed subject matter, and that various modifications can be made by those skilled in the art without departing from the scope and spirit of the disclosed subject matter. For example, the system and methods described herein are used for modeling a mobile ad hoc wireless network. It is understood that that techniques described herein are useful in connection with modeling any mobile network. Moreover, features of embodiments described herein may be combined and/or rearranged to create new embodiments.

We claim:

1. A method for modeling a mobile ad hoc wireless network for a predetermined geographical area, comprising:
   (a) dividing said geographic area into a network grid including a plurality of network grid elements;
   (b) locating one or more obstacles, if any, to communication between transmission nodes located in at least two different grid elements from said plurality of network grid elements;
   (c) locating one or more bottlenecks, within said plurality of network grid elements;
   (d) locating one or more network grid elements from said plurality of network grid elements where wireless transmission is unconstricted;
   (e) determining a transmission flow rate across said one or more bottlenecks;
   (f) comparing said transmission flow rate across said one or more bottlenecks to determine if any of said one or more bottlenecks are not real bottlenecks; and
   (g) removing said one or more bottlenecks that are not real bottlenecks from said model;
   wherein at least said determining is performed utilizing a processor operatively coupled to a wireless connection device, and further operatively coupled to a memory.

2. The method of claim 1, wherein locating one or more bottlenecks, within said plurality of network grid elements comprises:
   (a) determining the one or more minimum distances between at least two obstacles having a line of sight between them;
   (b) storing said one or more minimum distances for said at least two obstacles in numerical order; and
   (c) designating, in numerical order, said one or more minimum distances for said at least two obstacles as bottlenecks, wherein each subsequent minimum distance does not intersect any bottleneck already designated.

3. The method of claim 2, wherein locating one or more bottlenecks, within said plurality of network grid elements further comprises:
   (d) removing any bottlenecks that create areas only surrounded by bottlenecks;
   (e) removing duplicate bottlenecks between said at least two obstacles; and
   (f) removing bottlenecks that create small areas with respect to the size of said bottlenecks.

4. The method of claim 1, wherein determining said transmission flow rate across said one or more bottlenecks is performed by a transmission flow control algorithm.

5. The method of claim 4, wherein said transmission flow control algorithm is a max-min fair bottleneck flow control algorithm.

6. The method of claim 1, wherein comparing said transmission flow rate across said one or more bottlenecks to determine if any of said one or more bottlenecks are not real bottlenecks comprises:
   (a) ordering said transmission flow rate information for said one or more bottlenecks based one or more predetermined criteria; and
   (b) determining which bottlenecks have corresponding transmission flow rates that fall below a predetermined threshold.

7. The method of claim 6, wherein comparing said transmission flow rate across said one or more bottlenecks to determine if any of said one or more bottlenecks are not real bottlenecks further comprises:
   (c) determining whether the removal of any of said bottlenecks would result in said one or more network grid elements where wireless transmission is unconstricted to enclose one or more network grid elements where wireless transmission is constricted.

8. The method of claim 1, wherein locating one or more network grid elements from said plurality of network grid elements where wireless transmission is unconstricted comprises locating one or more network grid elements surrounded by at least said one or more obstacles and at least said one or more bottlenecks.

9. The method of claim 1, wherein transmission nodes located within said one or more network grid elements where wireless transmission is unconstricted are modeled as one or more super-nodes.

10. The method of claim 1, wherein said one or more bottlenecks are modeled as one or more links between said one or more network grid elements where wireless transmission is unconstricted.

11. The method of claim 9, wherein control of admission to said mobile ad hoc wireless network is controlled locally at each of said super-nodes by one or more nodes designated as one or more group leaders.

12. The method of claim 11, wherein said one or more group leaders are selected based on their proximity to a predetermined location in said super-node.

13. The method of claim 11, wherein said one or more group leaders are unselected when their distance from a predetermined location in said super-node exceeds a predetermined distance.

14. A system for modeling a mobile ad hoc wireless network for a predetermined geographical area, comprising:
   a processor, a wireless connection device operatively coupled to the processor, and a memory operatively coupled to the processor, the memory storing program instructions that when executed by the processor, cause the processor to utilize the wireless connection device to:
   divide said geographic area into a network grid including a plurality of network grid elements;
   locate one or more obstacles, if any, to communication between transmission nodes located in at least two different grid elements from said plurality of network grid elements;

locate one or more bottlenecks, within said plurality of network grid elements;

locate one or more network grid elements from said plurality of network grid elements where wireless transmission is unconstricted;

determine a transmission flow rate across said one or more bottlenecks;

compare said transmission flow rate across said one or more bottlenecks to determine if any of said one or more bottlenecks are not real bottlenecks; and remove said one or more bottlenecks that are not real bottlenecks from said model.

15. The system of claim 14, wherein said determination of the transmission flow rate across said one or more bottlenecks is performed by a transmission flow control algorithm.

16. A method for determining the a route for one or more information packets to travel across a mobile ad hoc wireless network to avoid congestion in bottleneck areas, for a predetermined geographical area, comprising:

(a) dividing said geographic area into a network grid including a plurality of network grid elements;

(b) locating one or more obstacles, if any, to communication between transmission nodes located in at least two different grid elements from said plurality of network grid elements;

(c) locating one or more bottlenecks, within said plurality of network grid elements;

(d) locating one or more network grid elements from said plurality of network grid elements where wireless transmission is unconstricted; and (e) applying a probabilistic geographic routing algorithm to find a grid-by-grid path for said one or more information packets to travel across;

wherein at least said applying is performed utilizing a processor operatively coupled to a memory.

17. The method of claim 16, wherein said probabilistic geographic routing algorithm operates in a geographic routing phase wherein packets of information are routed through anchor points, wherein said anchor points are located at said one or more bottlenecks.

18. The method of claim 16, wherein said probabilistic geographic routing algorithm operates in a probabilistic routing phase wherein packets of information are routed between anchor points, wherein said anchor points may be any of said one or more network grid elements located along said one or more bottlenecks.

19. The method of claim 16, wherein said probabilistic geographic routing algorithm operates in a probabilistic routing phase wherein packets of information are routed through anchor points, wherein said anchor points may be any of said one or more network grid elements located between said one or more bottlenecks.

20. The method of claim 16, wherein said probabilistic geographic routing algorithm operates to allow for four directional forwarding of packets of information.

21. The method of claim 16, wherein said probabilistic geographic routing algorithm operates to allow for eight directional forwarding of packets of information.

* * * * *